July 14, 1964
J. M. HAUSMAN
3,140,512
APPARATUS AND METHOD FOR CONTROLLING
THE CROWNING OF ROLLS AND THE LIKE
Filed April 17, 1962
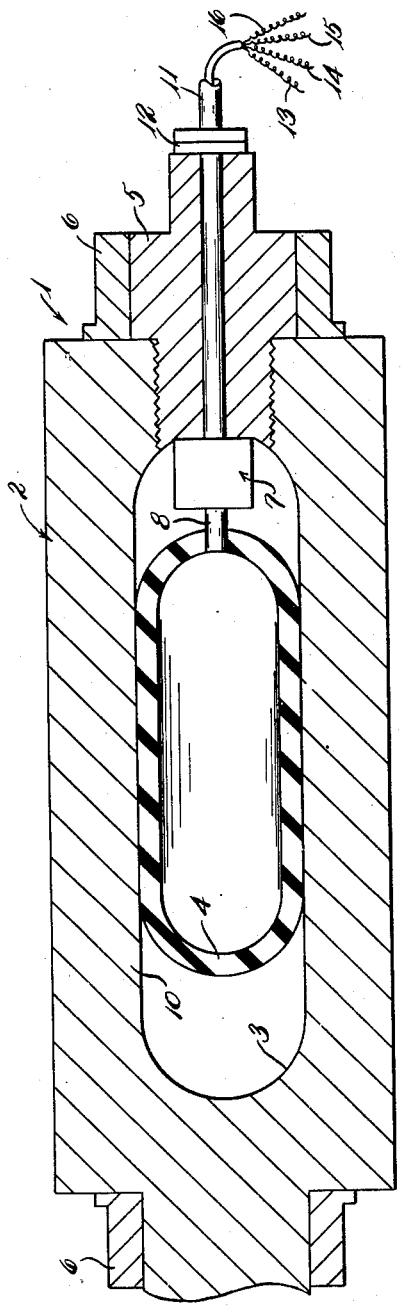
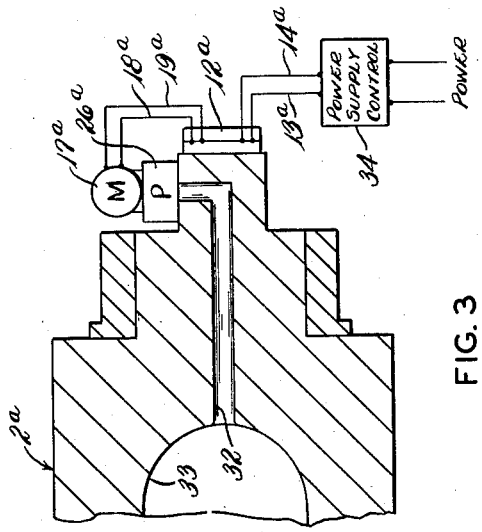
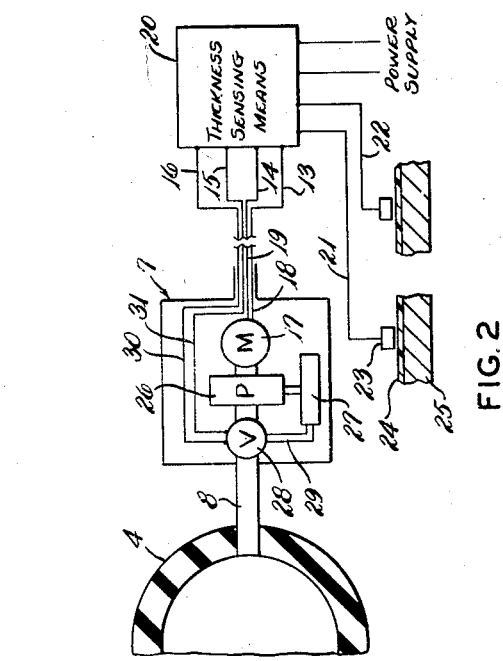
FIG. 1
FIG. 2
FIG. 3
INVENTOR.
JOHN M. HAUSMAN
BY Oldham & Oldham
ATTYS.

United States Patent Office 3,140,512
Patented July 14, 1964

3,140,512
APPARATUS AND METHOD FOR CONTROLLING THE CROWNING OF ROLLS AND THE LIKE
John M. Hausman, 2669 Wilbur Road, Rte. 4, Medina, Ohio
Filed Apr. 17, 1962, Ser. No. 188,193
6 Claims. (Cl. 18—2)

The present invention relates to an improved apparatus and method for controlling the crowning or shape of one or more rolls used for working or processing plastic material, and particularly to the control of apparatus for forming relatively wide sheets or films from plastic material and where such sheets or films must have an accurately controlled, uniform gage at laterally spaced portions thereof.

The present invention relates to the general subject matter of previous patents such as Patents Nos. 2,732,591; 2,648,122; 2,970,339 and 3,023,695. In processing or calendering plastic material, in many instances, the plastic material is fed between a pair of rolls, that have quite high pressures exerted thereon to form thin sheets or films of plastic. Hence the apparatus used is quite massive and strong, and is costly to produce and use. In such massive apparatus, it is difficult to control, accurately, the shapes of the heavy rolls used for the rolling or calendering action. Even with very heavy, strong rolls, which are usually supported at their ends and have a relatively wide roll passage or bight provided therebetween, the pressures set up in the apparatus by the rolling actions tend to bow, or curve the massive rolls intermediate the end supports provided therefor. Hence the patents referred to hereinbefore have endeavored to provide various types of apparatus for controlling this roll bend and for providing some type of a controllable crown on the roll intermediate the journalled end portions thereof.

My own previous Patent No. 2,970,339 discloses one improved type of apparatus for providing a controllable crown on rolls of the type referred to, but such apparatus requires some type of a rotary joint connecting pressure producing means to other means carried by the calender roll and where such rotary joint is difficult to maintain in a pressure tight condition.

The types of materials processed by rolls to which the present invention relates would include, but not necessarily be limited to the processing of natural and synthetic rubbers, and various plastic materials other than rubber and including substances such as polyvinyl chloride materials, chlorinated rubbers, and similar materials most of which become softer and more plastic at elevated temperature conditions. The rolls also may be used, for example, in any calendering, or paper processing action. Usually the rolls are heated in some manner, particularly when used with plastics, to aid in obtaining smooth material working conditions. These films produced by the rolling or calendering operations to which the invention relates may be quite thin, such as one or two thousandths of an inch, and it is quite important that the gage of these sheets produced be of uniform thickness at laterally spaced portions in any cross sectional portion of the film.

It is the general object of the present invention to provide a novel and improved roll means of the general type described and characterized by the provision of a pressure producing member or unit carried directly by the roll to have an adjustable crown formed thereon in accordance with the principles of the present invention.

Another object of the invention is to provide a relatively uncomplicated, inexpensive but sturdy apparatus for forming controllable crowns upon metal rolls.

Another object of the invention is to provide means, such as an electric motor and a hydraulic pump, that are directly secured to or are positioned within a roll of the invention and which only necessitate some type of a rotary electrical connection to the roll for supplying power thereto to provide expansive forces within the hollow roll for controlled crowning action thereof.

Yet another object of the invention is to measure the thickness of the sheet produced by one or more working rolls in providing a plastic film or sheet and where such thickness is measured concurrently at a plurality of laterally spaced portions thereof and with the control means then being adapted to send control impulses to the working roll for varying the crown producing forces therein dependent upon the uniformity of the plastic film or sheet being produced.

The foregoing and other objects and advantages of the invention will be made more apparent as the specification proceeds.

In order to understand the present invention, reference now should be had to the accompanying drawings, wherein:

FIG. 1 is a vertical section through a novel roll means embodying the principles of the invention;

FIG. 2 is an enlarged view, partially diagrammatic, of a portion of the control and pressure means as shown in FIG. 1 of the drawings; and FIG. 3 is a partly diagrammatic view of a modification of the apparatus of the invention.

When referring to corresponding members shown in the drawings and described in the specification, corresponding numerals are used to facilitate comparison therebetween.

Generally speaking, the present invention relates to apparatus for controlling an adjustable crown provided on a roll used for subjecting web materials to pressure treatment and including a roll having a hollow, fluid tight center portion and where the roll has combined therewith an electric motor carried by the roll, a hydraulic pump connected to and driven by the electric motor, means connecting the outlet of the hydraulic pump to the hollow center of the roll to set up a pressure therein to expand the walls of the roll, and power supply means operably connecting to the electric motor from a remote point to supply electrical energy thereto and control operation of the motor and consequently the pressure set up within the roll and the crown provided thereon.

Reference now is particularly directed to the details of the structure shown in the accompanying drawings, and the control apparatus of the invention is indicated as a whole by the numeral 1. Such apparatus 1 includes a metal roll 2 usually used for plastic or other material processing operations in conjunction with another roll (not shown) and where the material being processed would pass through a narrow roll bight provided between the roll 2 and the associated surface. In some instances it is possible that the roll 2 may process material in association with a stationary member, but usually a pair of rotating surfaces are provided for the desired web or material processing action to provide a sheet or film of the material being processed. This roll 2 is shown as provided with a hollow, fluid tight center portion 3. In this particular embodiment of the invention, an expansible container 4 is provided within the hollow center 3 to confine a pressure producing fluid used in association with the roll 2 within the container and facilitate maintaining the pressure thereon and flow, or return of the pressure material to associated reservoir means, as hereinafter described in more detail.

In order to permit access to the hollow center 3 of the roll, an end plug 5, or the like, is provided and is shown as being in threaded engagement with an end of the roll 2 and connecting directly to the hollow center 3 thereof. The roll 2 and end plug 5 are shown as being provided with any desired types of bearings 6, 6 that are secured thereto or carried thereby and are adapted to be positioned by a suitable frame, or other support means.

FIG. 1 of the drawings shows a control unit, or pressure supply box 7 that is received within the hollow center 3 and has a suitable conduit 8 extending from this control unit 7 and suitably connecting to the interior of the container 4. Obviously this container 4 may be made from any suitable material such as a heavy, wire, fabric, or glass fiber, reenforced plastic envelope of a size as to fit snugly within this hollow center 3 and being sufficiently flexible and resilient as to be expanded to exert radially outwardly directed forces against associated walls 10 of the roll 2 to provide a controllable crowning action thereon. Normally the container 4 would be centered on the longitudinal operative axis of the roll 2 and be positioned at the center of the working portion of such roll 2. The control unit 7 preferably would be suitably secured to the end plug 5 and has means, such as a control pipe 11, extending therefrom through a center bore in the end plug 5 to extend to means, such as a rotary electrical connecting member 12, of substantially conventional construction operatively associated with the end of the end plug 5. A plurality of leads 13, 14, 15 and 16 are shown extending from this rotary coupling 12 for control actions for and to supply operative energy to the control unit 7, as hereinafter described.

By the apparatus of the invention, the pressure producing means is provided within the control unit 7, and electrical energy to operate such control unit 7 is supplied to it from a remote spot through means such as the rotary coupling 12 and leads extending therefrom to any desired type of control means.

Attention now is particularly directed to the details shown in diagrammatic form in FIG. 2 and which indicate one typical construction for the control unit 7 and associated means whereby an automatic control can be set up to vary the crown action obtained on the roll 2 dependent upon the operative conditions of the roll and the material being processed thereby. In this instance, the control unit 7 is shown as including a conventional small electric motor 17 which has a pair of leads 18 and 19 extending therefrom for connection to a member, such as the rotary coupling 12 but likewise extending to a thickness sensing means 20 and connecting thereto through the leads 13 and 14, as shown. This thickness sensing means 20 is of substantially conventional construction and has the four control leads 13 through 16 connecting thereto. The thickness sensing means also has leads 21 and 22 extending therefrom and connecting to suitable indicating means indicated diagrammatically at 23 in the drawings and which indicating or measuring means 23 engages a film 24 such as has been produced by the rolling or calendering action of the roll 2 for measuring the thickness of this film 24 at laterally spaced portions thereof to determine whether or not the roll 2 has the proper crown provided at the center thereof. Thus one means 23 normally would be at the center of the film and the other means 23 would be adjacent a margin of the film. A support or base 25 is shown in association with the film 24 to support it to aid in obtaining accurate measuring action of the means 23. However, it should be realized that the drawing is diagrammatic and that any suitable type of a thickness gage can be used to measure the film 24, preferably at laterally spaced portions thereof and with such thickness measuring means then connecting back to the thickness sensing means 20 for sending out proper control impulses therefrom when the film thickness varies at these laterally spaced portions.

The control unit 7, in addition to the electric motor 17, includes a suitable small hydraulic pump 26 operatively connected to the electric motor so that when the motor 17 is actuated, it will drive the hydraulic pump 26 to force hydraulic fluid from an associated hydraulic reservoir 27 through the pump 26 to be expelled therefrom under a desired pressure to flow through a solenoid controlled valve 28 which in turn connects to the conduit 8. This solenoid valve 28 is preferably of the so-called "4-way" style, and it is adapted, when released, to release pressure fluid from the container 4 through the conduit 8 and back through a conduit 29 that connects the valve 28 to the reservoir 27 or, when energized, to pass fluid to the conduit 8 to flow to the container 4 and increase the hydraulic pressure set up therein for additional crowning or expansion action on the roll 2 at the center portion thereof, and to retain the pressure until the valve is deenergized.

The solenoid valve 28 is shown as having a pair of control leads 30 and 31 extending therefrom and connecting, respectfully, to the leads 15 and 16 that extend to the thickness sensing gage. Hence the valve 28 is so built that it retains the pressure fluid passed therethrough and will permit flow of further hydraulic pressure fluid to the container 4, or else the valve 20 permits flow from the container 4 through the valve to the reservoir 27 for storage action.

The thickness sensing means 20 usually includes a switch to deenergize the solenoid valve 28. The valve 28 and motor 17 would be simultaneously energized when the roll needed more of a crown. The motor 17 would stop when the indicating means 23 would indicate proper uniformity of thickness of the film or sheet produced. The solenoid valve 28 would then retain the pressure set up within the roll 2 until such valve would be manually released by movement of a suitable control switch in the means 20.

Naturally the pump 17 and valve 28 can be manually controlled or actuated by remote power supply means, if substantially automatic action is not required.

The container 4 may be omitted when the entire chamber 3 is to be used to receive the pressure fluid. Or, the container 4 may occupy the entire chamber 3. Such chamber 3 does not need to be fluid tight when the container 4 is present.

It will be realized that the crown producing means may be provided in either one or both of a pair of material working rolls.

Attention now also is directed to the details shown in FIG. 3 where a modified structure of the invention is provided. In this instance, a roll 2a is shown which has a fluid pressure supply bore 32 therein and connecting to a fluid tight hollow center 33 in the roll. An electric motor 17a is shown operatively connected to a hydraulic pump 26a that has its output connected to the bore 32 for supply of pressure liquid to this hollow center 33 in the roll. The electric motor 17a has a pair of leads 18a and 19a that extend therefrom and connect to a suitable rotary coupling 12a and then in turn has a pair of leads 13a and 14a extending therefrom to a suitable power supply control 34. Suitable A.C. power in turn connects to this control 34 and any conventional switch or other operating means may be associated with the control whereby the motor 17a can be turned on or off, and, if desired, a valve member like the solenoid operated valve 28 would be provided in association with the pump 26a for controlling flow of pressure fluid from the hollow center 33 of the roll back to a reservoir for the pump or for flow from the pump to the hollow center, as desired. In this instance, the power supply control can be manually actuated and any suitable instruments can be associated wtih the roll 2a, or the film produced thereby to measure or determine the extent of the crowning action obtained in such roll. It will be realized that a removable end plug can be provided in this roll 2a, if desired, or that some other type of a removable end plate or end closure member can be present in the roll 2a or 2.

The rolls, or calenders used in the apparatus of the invention can have either uniform radially thick walls provided therein, or, if desired, the thickness of such walls may taper or reduce in a direction extending axially inwardly of the roll whereby the roll may have its thinnest section adjacent the center portion thereof. In all events, normally the walls of the rolls 2 and 2a are of sufficient thickness and strength that they have rigidity to withstand normal pressures applied thereon, but when relatively high rolling pressures are applied thereto, they may be deflected slightly. By the hydraulic pressures provided internally of these rolls, they can be caused to bulge outwardly and provide a crown action on the roll whereby the actual film of plastic material being processed can have quite accurate gage at laterally spaced portions thereof.

It will be realized that the hollow center 31 provided in the roll 2a would be centered axially of the journalled or supported portions of the roll 2a to aid in obtaining a desired crowning action for such roll and have the crown centered intermediate the journals of the roll.

From the foregoing, it is believed that a novel and improved and automatic method has been provided for controlling the crowning action of a roll and with the apparatus of the invention being relatively inexpensive and being of a sturdy construction. Thus it is believed that the objects of the invention have been achieved.

While two complete embodiments of the invention have been disclosed herein, it will be appreciated that modification of these particular embodiments of the invention may be resorted to without departing from the scope of the invention as defined in the appended claims.

What I claim is:

1. In a cylindrical roll having a center chamber and a working face and having rigid walls of sufficient strength to withstand normal operative forces applied thereto, said chamber being longitudinally centered within said roll in relation to the end supports provided therefor, means within said chamber for expanding the roll to provide it with a crown intermediate the ends thereof, electrically actuated pressure producing means carried by said roll and operatively engaging said first means for applying pressure thereto to set up expansive forces on said roll walls to form a crown thereon, and remote power supply means electrically connected to said pressure producing means to control operation thereof.

2. In a cylindrical calender roll having a chamber underlying its working face and having rigid walls of sufficient strength to withstand normal operative forces applied thereto, means within said chamber for expanding the roll when pressure is operatively associated with said means to provide the roll with a crown intermediate the ends thereof, and controllable pressure producing means carried by said roll and engaging said first means for applying pressure thereto to set up expansive forces on said roll walls and form a crown thereon.

3. In a cylindrical calender roll having a center chamber therein, flexible container means within said chamber for expanding the roll to provide it with a crown intermediate the ends thereof, pressure producing means operatively carried by said roll and operatively engaging said first means for applying pressure thereto to set up expansive forces on said roll walls to form a controllable crown thereon, and remote control means electrically connected to said pressure producing means to control the pressures set up within said container means.

4. In apparatus for controlling the crowning of a roll used for subjecting web materials to pressure treatment and including a roll having a hollow fluid tight center portion, the combination of an electric motor carried by said roll, a hydraulic pump connected to and driven by said electric motor, means connecting the outlet of said hydraulic pump to said hollow center to set up pressure therein and controllably expand the walls of said roll, and power supply means operably connecting to said electric motor to supply electrical energy thereto and control operation thereof.

5. In apparatus for controlling a roll used for subjecting web materials to pressure treatment and including a roll having a hollow center portion with uniform thickness walls, the combination of a flexible pressure container received in said hollow center portion and contacting opposed walls thereof at the longitudinal center of said roll, an electric motor carried by said roll, a hydraulic pump connected to and driven by said electric motor, means connecting said hydraulic pump to said container to set up hydraulic pressure therein and controllably expand the walls thereof for crowning said roll, and stationary means operably connecting to said electric motor to supply electrical energy thereto for change in the pressure within said container and to control the crown of said roll.

6. In apparatus for controlling the crown of a roll used for subjecting plastic materials to pressure treatment and including a roll having a hollow center portion with uniform thickness walls, the combination of a flexible pressure container received in said hollow center portion and contacting opposed walls thereof at the longitudinal center of said roll, an electric motor carried by said roll within said center portion, a hydraulic pump within said center portion connected to and driven by said electric motor, solenoid operated valve means connecting said hydraulic pump to said container to set up pressure therein and controllably expand the walls thereof for crowning said roll, a reservoir connected to said valve means and to said pump, and stationary means operably connecting to said electric motor and to said solenoid valve to supply electrical energy thereto to control the operation thereof.

References Cited in the file of this patent
UNITED STATES PATENTS

| | | |
|---|---|---|
| 1,989,038 | Brown | Jan. 22, 1935 |
| 2,025,562 | Balsiger | Dec. 24, 1935 |
| 2,660,077 | MacCaulay et al. | Nov. 24, 1953 |